United States Patent
Käske

(10) Patent No.: US 8,409,429 B2
(45) Date of Patent: Apr. 2, 2013

(54) FILTER DEVICE AND FILTER METHOD

(75) Inventor: Egon Käske, Aachen (DE)

(73) Assignee: Durr Ecoclean GmbH, Filderstadt (DE)

( * ) Notice: Subject to any disclaimer, the term of this patent is extended or adjusted under 35 U.S.C. 154(b) by 0 days.

(21) Appl. No.: 12/205,354

(22) Filed: Sep. 5, 2008

(65) Prior Publication Data

US 2009/0101601 A1 Apr. 23, 2009

Related U.S. Application Data

(63) Continuation of application No. PCT/EP2007/001571, filed on Feb. 23, 2007.

(30) Foreign Application Priority Data

Mar. 9, 2006 (DE) .................. 10 2006 010 843

(51) Int. Cl.
*B01D 29/66* (2006.01)
*B01B 21/24* (2011.01)

(52) U.S. Cl. ............ 210/86; 210/97; 210/104; 210/108; 210/248; 210/313; 210/411

(58) Field of Classification Search ........................ None
See application file for complete search history.

(56) References Cited

U.S. PATENT DOCUMENTS

| | | | |
|---|---|---|---|
| 3,637,079 A | 1/1972 | Strub | |
| 4,089,781 A | 5/1978 | Asp | |
| 4,107,033 A | 8/1978 | Holz | |
| 4,592,847 A | 6/1986 | Schumacher | |
| 5,346,629 A * | 9/1994 | Wuller ........................ | 210/739 |
| 5,628,916 A * | 5/1997 | Stevens et al. ................ | 210/798 |
| 6,379,538 B1 | 4/2002 | Corlett et al. | |
| 8,309,711 B2 * | 11/2012 | Wiley ........................... | 536/127 |
| 2001/0013491 A1 | 8/2001 | Kaske | |
| 2004/0221900 A1 | 11/2004 | Kaske | |
| 2005/0189303 A1 | 9/2005 | Kaeske | |
| 2009/0101601 A1 * | 4/2009 | Kaske ........................... | 210/798 |
| 2011/0031192 A1 * | 2/2011 | Wiley ........................... | 210/770 |

FOREIGN PATENT DOCUMENTS

| | | |
|---|---|---|
| CA | 2480262 | 5/2004 |
| CN | 1691982 | 11/2005 |
| DE | 2602581 | 7/1976 |
| DE | 2611885 | 9/1977 |
| DE | 7725489 | 5/1978 |
| DE | 19521741 | 12/1996 |

(Continued)

OTHER PUBLICATIONS

International Searching Authority, International Search Report for International Application No. PCT/EP2007/001571, Jul. 2, 2007, 4 pages.

(Continued)

*Primary Examiner* — Robert James Popovics

(74) *Attorney, Agent, or Firm* — Hanley, Flight & Zimmerman, LLC

(57) ABSTRACT

In order to provide a filter device for filtering a fluid medium containing solids, comprising a backflushing filter and a flushing line, by means of which fluid backflushed during a backflushing phase from the backflushing filter can be supplied to a further treatment mechanism, in which the discharging of dirt from the backflushing filter is simplified, it is proposed that the backflushing filter should have a coarse dirt outlet which is connected to the flushing line so that coarse dirt which has arrived through the coarse dirt outlet into the flushing line can be supplied to the further treatment mechanism together with the backflushed fluid during the backflushing phase.

5 Claims, 7 Drawing Sheets

FOREIGN PATENT DOCUMENTS

| | | |
|---|---|---|
| DE | 19803083 | 7/1999 |
| DE | 10006262 | 8/2001 |
| DE | 10151864 | 4/2003 |
| EP | 0153972 | 9/1958 |
| EP | 1306118 | 5/2003 |
| EP | 1424119 | 6/2004 |
| SU | 1813513 | 5/1993 |
| WO | 0174470 | 10/2001 |
| WO | 2004041438 | 5/2004 |

OTHER PUBLICATIONS

German Search Report of German patent Application No. 10 2006 010 843.4, Sep. 3, 2006, 4 pages.
Canadian Intellectual Property Office, office action issued for Canadian application 2,642,228, May 7, 2010, 2 pages.
The State Intellectual Property Office of the People'S Republic of China, Office Action issued for CN Application No. 200780008508. 4, issued May 12, 2010, 8 pages.
International Searching Authority, International Search Report for International application No. PCT/EP2007/001570, Jun. 6, 2007, 4 pages.
German Search Report of German patent Application No. 10 2006 010 842.6, Sep. 3, 2006, 4 pages.
Description of the contents of SU 1813513 A1 which was cited in the office action issued by the Russian patent office, published on May 7, 1993, 1 page.
Russian Patent Office, Office Action issued in Russian application 2008139806, stamped Feb. 1, 2011, 5 pages.
(German Language text) Russian Patent Office, Office Action issued in Russian application 2008139806, Office Action stamped Feb. 1, 2011, 4 pages.
United States Patent and Trademark Office, "Final Office Action," issued in connection with U.S. Appl. No. 12/205,490, mailed on Jan. 4, 2012, 15 pages.
United States Patent and Trademark Office, "Non-Final Office Action," issued in connection with U.S. Appl. No. 12/205,490, mailed on Oct. 30, 2009, 19 pages.
United States Patent and Trademark Office, "Final Office Action," issued in connection with U.S. Appl. No. 12/205,490, mailed on Sep. 16, 2010, 6 pages.
United States Patent and Trademark Office, "Notice of Allowance," issued in connection with U.S. Appl. No. 12/205,490, mailed on Jun. 29, 2012, 8 pages.
Oct. 30, 2009, Office Action from U.S. Appl. No. 12/205,490: International Searching Authority, "Written Opinion," issued in connection with International Application No. PCT/EP2007/001570, mailed on Jul. 2, 2007, 10 pages.

* cited by examiner

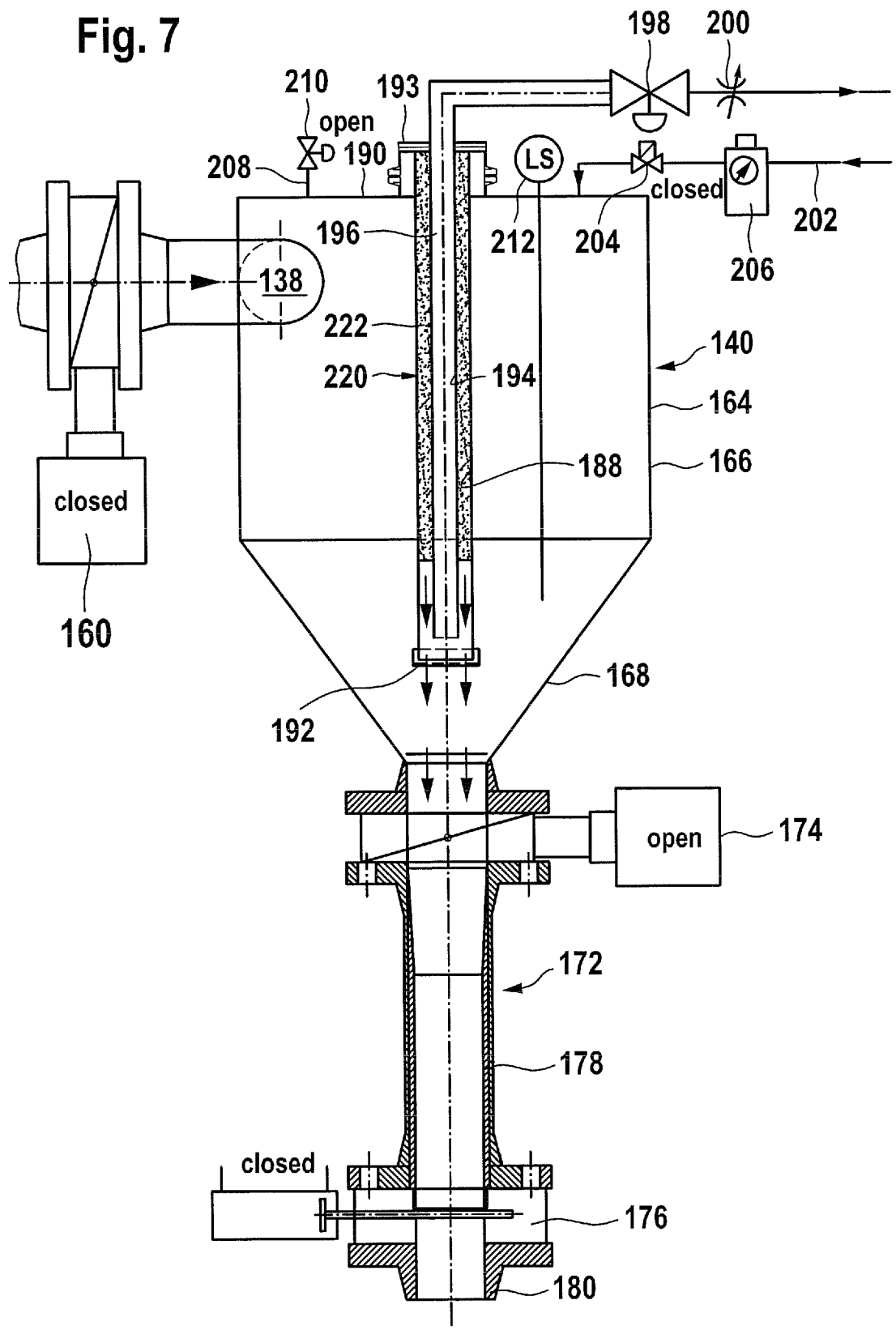

FILTER DEVICE AND FILTER METHOD

RELATED APPLICATION

This application is a continuation application of PCT/EP2007/001571 filed Feb. 23, 2007, the entire specification of which is incorporated herein by reference.

FIELD OF THE DISCLOSURE

The present invention relates to a filter device for filtering a fluid medium containing solids, the filter device comprising a backflushing filter and a flushing line, by means of which backflushed fluid can be supplied from the backflushing filter to a further treatment mechanism during a backflushing phase.

BACKGROUND

Filter devices of this type are known from the prior art.

In known filter devices of this type, the fluid which is backflushed during the backflushing phase, on the one hand, and coarse dirt which has accumulated in the backflushing filter, on the other hand, are supplied by means of separate disposal lines to a collecting container.

The present invention is based on the object of providing a filter device of the type mentioned at the outset, in which the discharge of dirt from the backflushing filter is simplified.

SUMMARY OF THE INVENTION

This object is achieved according to the invention in a filter device with the features of the preamble of claim 1 in that the backflushing filter has a coarse dirt outlet which is connected to the flushing line, so that coarse dirt which has arrived in the flushing line through the coarse dirt outlet can be supplied together with the backflushed fluid to the further treatment mechanism during the backflushing phase.

In the solution according to the invention, the flushing line for the fluid which has been backflushed during the backflushing phase and the coarse dirt outlet for discharging coarse dirt from the backflushing filter are connected to one another, so the backflushed fluid and the coarse dirt from the connection point of the coarse dirt outlet and flushing line are supplied in a common line to the further treatment mechanism. Since the coarse dirt is located in the flow path of the fluid from the backflushing filter which has been backflushed during the backflushing phase, the accumulated coarse dirt is transported in a simple and effective manner to the further treatment mechanism without the supply of additional fluid being necessary for this.

The fluid consumption of the filter device is significantly reduced as a result.

The filter device according to the invention is suitable, in particular, for use in cleaning systems with aqueous cleaners, oils and/or emulsions.

The solids contained in the fluid medium to be filtered may, in particular, comprise ferromagnetic solids.

In a preferred configuration of the invention, it is provided that the course dirt outlet can be closed by means of a coarse dirt valve.

It may also be provided that the course dirt outlet opens into a substantially horizontally extending portion of the flushing line. This portion then forms a coarse dirt collecting chamber of the filter device.

In order for it to be achieved that a backflushing phase of the backflushing filter is always initiated when a certain quantity of coarse dirt has accumulated in a coarse dirt collecting chamber of the filter device, it may be provided that the filter device comprises a sensor, by means of which the filling level of the coarse dirt collecting chamber in the coarse dirt outlet and/or in the flushing line can be detected.

A sensor of this type may be configured, in particular, as a metal sensor.

The flushing line may then have a backflushing valve which is arranged upstream of the mouth of the coarse dirt outlet into the flushing line.

Furthermore, the flushing line may have a discharge valve which is arranged downstream of the mouth of the coarse dirt outlet and therefore blocks or clears the access to the further treatment mechanism.

In a preferred configuration of the invention, the backflushing filter is configured as an automatic backflushing filter, the backflushing phase of which is automatically initiated when the dirt receiving capacity of a filter element of the backflushing filter has been exhausted and/or a certain quantity of coarse dirt has accumulated in the coarse dirt collecting chamber.

The further treatment mechanism for further treatment and processing of the backflushed fluid with the contaminants contained therein, in particular the coarse dirt contained therein, may, in particular, comprise a sedimentation device and/or a solids separator.

The present invention is based on the further object of providing a filter method for filtering a medium containing solids by means of a backflushing filter, which simplifies the discharge of dirt from the backflushing filter.

This object is achieved according to the invention by a filter method for filtering a medium containing solids by means of a backflushing filter, comprising the following method steps:
  discharging coarse dirt from the backflushing filter through a coarse dirt outlet into a flushing line during a filtering phase;
  backflushing the backflushing filter and supplying backflushed fluid from the backflushing filter together with coarse dirt which has accumulated in the flushing line to a further treatment mechanism during a backflushing phase.

Since, in the method according to the invention, the coarse dirt is flushed together with the backflushed fluid from the backflushing filter to the further treatment mechanism, the coarse dirt is transported in a very efficient manner to the further treatment mechanism without the supply of additional fluid being necessary for this.

Particular configurations of the filter method according to the invention are the subject of the dependent claims 10 to 15, the advantages of which have already been described above in conjunction with the particular configurations of the filter device according to the invention.

Further features and advantages of the invention are the subject of the following description and the graphical view of an embodiment.

BRIEF DESCRIPTION OF THE DRAWINGS

FIG. 7 shows a view of the sedimentation device corresponding to FIG. 6, in a screen flushing phase of the sedimentation device.

The same or functionally equivalent elements are designated by the same reference numerals in all the figures.

DETAILED DESCRIPTION OF THE INVENTION

A filter device designated as a whole by 100 and shown in FIG. 1 to 7 for filtering a fluid medium containing solids, for example an aqueous cleaner, an oil or an emulsion, comprises a dirt tank 102 for receiving the medium to be filtered, which is connected to a dirt-side compartment 106 of a backflushing filter 108 by means of a filter supply line 104.

A filter pump 110 for conveying the medium to be filtered from the dirt tank 102 to the backflushing filter 108 is arranged in the filter supply line 104.

Figure 2:
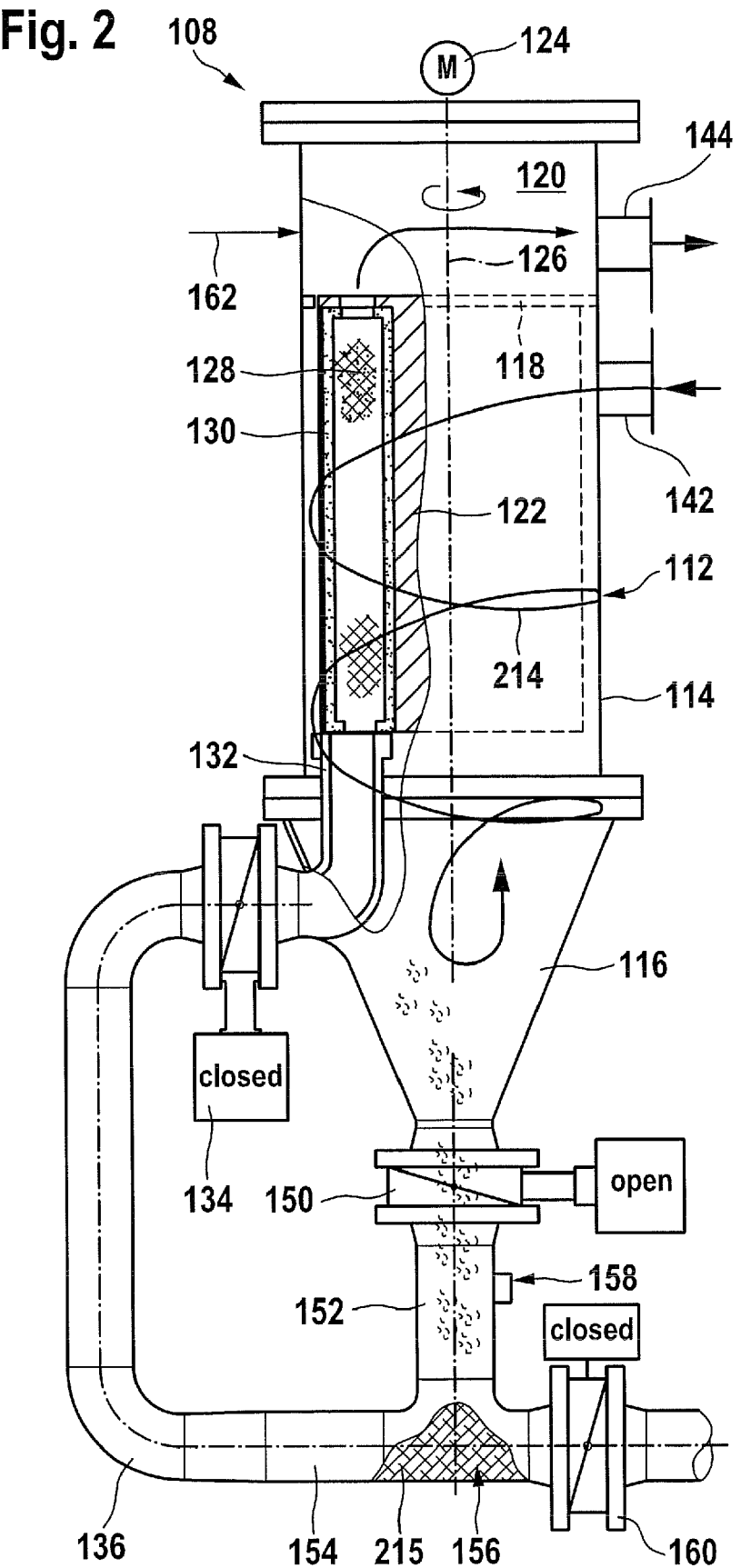
FIG. 2 shows a partially sectional side view of a backflushing filter with a coarse dirt outlet and a flushing line of the filter device from FIG. 1, during a filtering phase of the backflushing filter.
Figure 3:
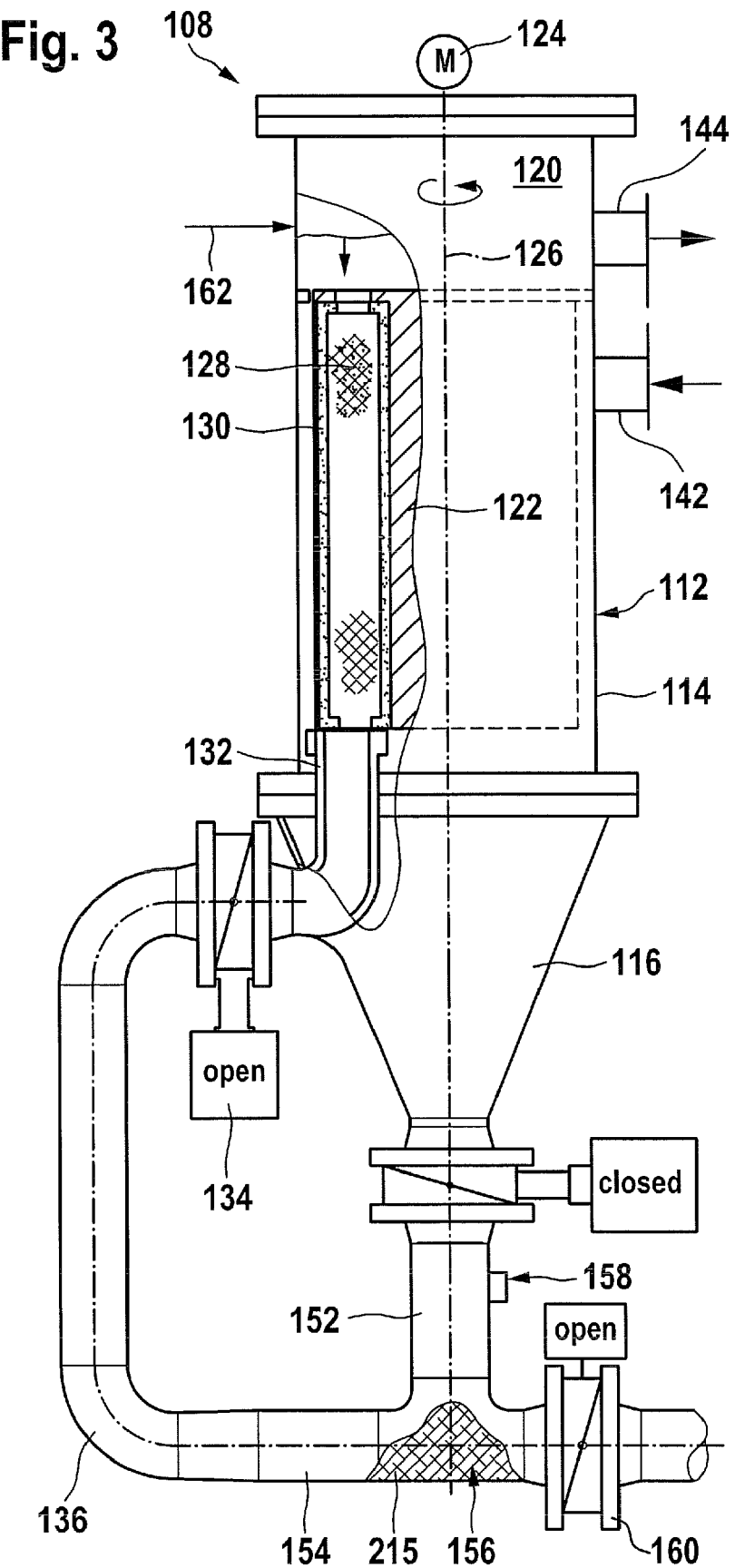
FIG. 3 shows a view of the backflushing filter corresponding to FIG. 2 with the coarse dirt outlet and the flushing line during a backflushing phase of the backflushing filter.

The structure of the backflushing filter 108 can be seen in detail from FIGS. 2 and 3.

The backflushing filter 108 comprises a filter housing 112 with a substantially cylindrical upper portion 114 and a lower portion 116, which tapers conically downwardly, adjoining the bottom of the upper portion 114.

The upper portion 114 of the filter housing 112 is separated by a horizontal partition 118 into a filtrate-side compartment 120 located above the partition 118 and the dirt-side compartment 106 located below the partition 118, the interior of the lower portion 116 of the filter housing 112 also being included with the dirt-side compartment 106 of the backflushing filter 108.

A filter insert 122 is also arranged in the filter housing 112 and can be rotated by means of a motor 124 about a vertical axis 126 of a rotation and contains a plurality of filter elements 128, which, by rotating the filter insert 122 about the axis 126 of rotation, can be moved one after the other into a filter chamber 130 of the backflushing filter 108.

The filter element 128 respectively located in the filter chamber 130 is, on the filtrate side, connected to the filtrate-side chamber 120 of the filter housing 112 and, on the dirt side, to a backflushing line 132, which leads from the filter chamber 130 to a backflushing valve 134. The backflushing valve 134 is furthermore connected to a flushing line 136 which leads from the backflushing filter 108 to a fluid inlet 138 (see FIG. 4) of a sedimentation container 140.

A dirt-side feed 142, opening into the dirt-side compartment 106 of the filter housing 112, of the backflushing filter 108 is connected to the filter supply line 104.

A filtrate-side return 144 opening into the filtrate-side compartment 120 of the filter housing 112, of the backflushing filter 108 is connected by means of a filter return line 146 (see FIG. 1) to a clean tank 148 to receive the filtered medium.

Furthermore, a compressed air supply 162, which is connected to a compressed air source (not shown), opens into the filtrate-side compartment 120 of the filter housing 112.

The conically tapering lower portion 116 of the filter housing 112 can be connected at its lower end by means of a coarse dirt valve 150.

The coarse dirt valve 150 is furthermore connected to the flushing line 136 by means of a vertically extending coarse dirt line 152, the coarse dirt line 152 being used as a coarse dirt outlet opening at its lower end into a substantially horizontally extending portion 154 of the flushing line 136, so a coarse dirt collecting chamber 156 is formed in the flushing line 136 in the region of the mouth of the coarse dirt line 152.

A metal sensor 158 to detect the filling level of the coarse dirt in the coarse dirt line 152 is arranged on the coarse dirt line 152.

Arranged downstream of the coarse dirt collecting chamber 156 in the flushing line 136 is a backflushing discharge valve 160, by means of which the access to the sedimentation container 140 shown in detail in FIG. 4 to 7 can be blocked.

The sedimentation container 140 comprises a container housing 164 with a substantially cylindrical upper portion 166 and a lower portion 168 tapering conically downwardly and adjoining the bottom of the upper portion 166.

The flushing line 136 opens into the upper portion 166 of the container housing 164 by means of the fluid inlet 138, specifically above a fluid level 170 in the sedimentation container 140.

The lower end of the conically tapering portion 168 of the sedimentation container 140 opens into a sluice device designated as a whole 172, which comprises an upper sluice valve 174 adjoining the sedimentation container 140, a lower sluice valve 176 forming a lower termination of the sluice device 172 and a sluice chamber 178 arranged between the upper sluice valve 174 and the lower sluice valve 176, the inner chamber of which sluice chamber forms a sediment collecting region.

The lower sluice valve 176 may be formed as a slide valve, in particular.

Figure 1:
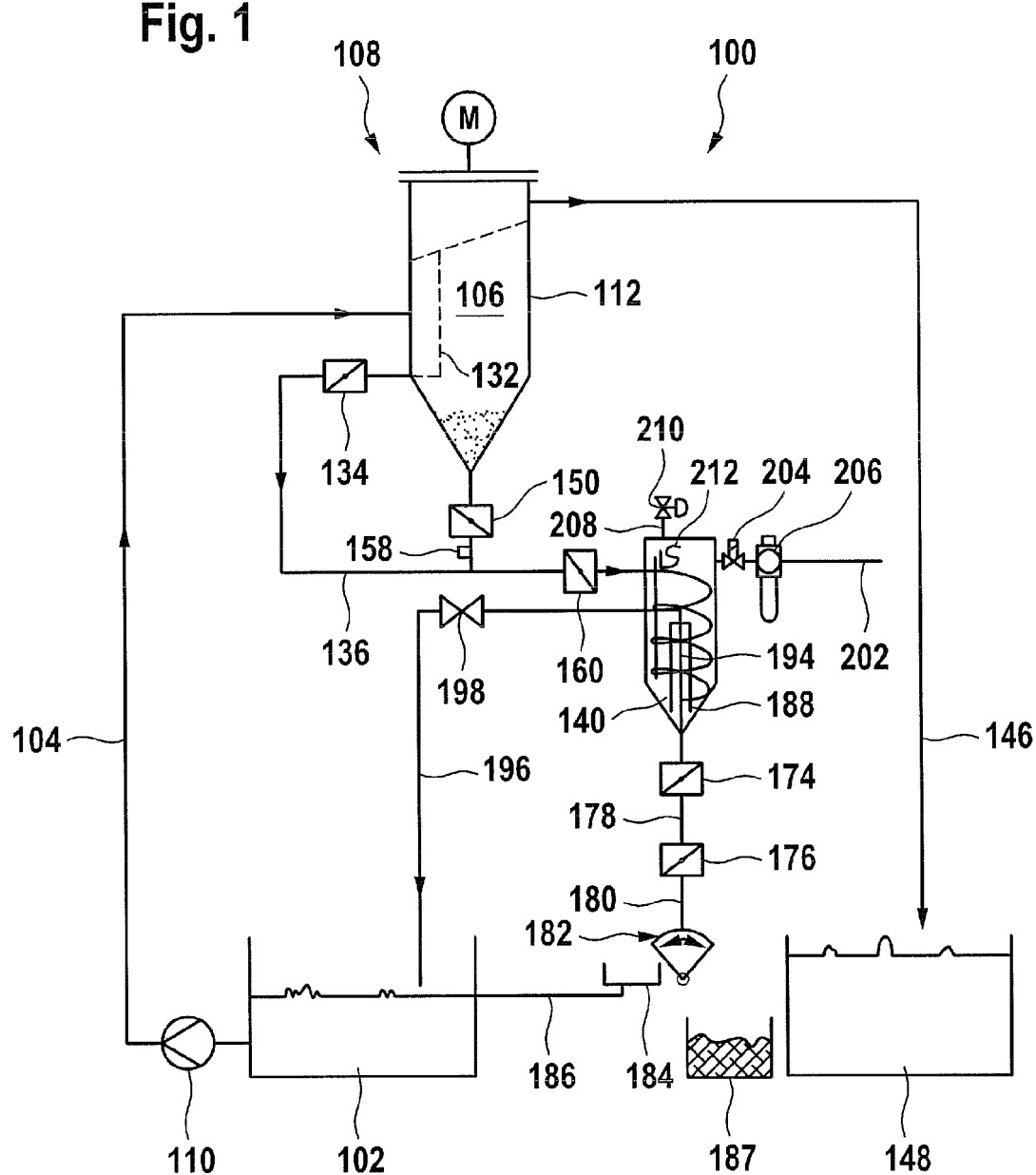
FIG. 1 shows a schematic view of a filter device for filtering a fluid medium containing solids.

The lower sluice valve 176 is furthermore connected by means of a sediment discharge line 180 to an inlet of a solids separator 182 (see FIG. 1).

The solids separator 182 is used to separate the remaining fluid medium containing sediment coming from the sluice chamber 178 from the solids portion of the sediment.

The solids separator 182 may, in particular, be constructed and function in the manner of the magnetic solids separator described in WO 2004/041438 A1. Reference is expressly made here to WO 2004/041438 A1 in relation to the structure and the mode of functioning of a solids separator of this type.

A residual fluid return line 186 leads from a fluid outlet 184 of the solids separator 182 to the dirt tank 102.

The solids fraction of the sediment from the sluice chamber 178 separated from the residual fluid in the fluids separator 182 arrives in a solids collecting container 187.

Furthermore, arranged substantially centrally in the sedimentation container 140 is a flushing tube 188 which extends along a substantially vertical tube axis through a lid 190 of the sedimentation container 140 into the interior thereof into the lower portion 168 of the container housing 164 and opens there into the inner chamber of the sedimentation container 140 at a point located below the fluid level 170.

The mouth of the flushing tube 188 is closed by a screen 192 at the lower end thereof.

The upper end of the flushing tube 188 is closed by a sealing plate 193.

A starting portion 194 arranged coaxially with respect to the flushing tube 188, of a clear phase return line 196, which passes through the sealing plate 193 and leads from the sedimentation container 140 to the dirt tank 102, extends inside the flushing tube 188 (see FIG. 1).

A check valve 198 and a through-flow regulator 200 are arranged in the clear phase return line 196.

A compressed air supply line 202, in which a compressed air valve 204 and a pressure regulator 206 are arranged, furthermore opens into the part of the interior of the sedimentation container 140 located above the fluid level 170.

The compressed air supply line 202 is connected to a compressed air source (not shown).

Furthermore, a ventilation line 208, in which a ventilation valve 210 is arranged, opens into the part of the interior of the sedimentation container 140 located above the fluid level 170, so that the interior of the sedimentation container 140 can be ventilated with ambient air when the ventilation valve 210 is open.

Furthermore, the sedimentation container 140 is provided with a level probe 212 to detect the fluid level 170 inside the sedimentation container 140.

The filter device 100 described below functions as follows:

The fluid medium mixed with solids to be filtered off, for example an aqueous cleaning fluid, oil or emulsion, is collected in the dirt tank 102.

The medium to be filtered is supplied from the dirt tank 102 by means of the filter pump 110 to the dirt-side compartment 106 of the backflushing filter 108.

As can be seen from FIG. 2, the supply 142 of the backflushing filter 108 runs substantially tangentially to the inner boundary wall of the filter housing 112, so the medium to be filtered moves in a helical path 214 through the interior of the filter housing 112.

On entry of the medium to be filtered into the backflushing filter 108, heavy dirt particles sink downward through the opened coarse dirt valve 150 and the coarse dirt line 152 into the coarse dirt collecting chamber 156 in the flushing line 136, where a coarse dirt accumulation 215 forms as a result during the filtering phase of the backflushing filter 108 (see FIG. 2).

During this filtering phase of the backflushing filter 108 shown in FIG. 2, the backflushing valve 134 and the backflushing discharge valve 160 are closed.

The medium to be filtered is supplied from the dirt-side chamber 106 of the backflushing filter 108 through the filter element 128 located in the filter chamber 130 to the filtrate-side chamber 120 of the backflushing filter 108.

The filtrate arrives from the filtrate-side chamber 120 of the backflushing filter 108 by means of the filter return line 146 into the clean tank 148.

When passing through the filter element 128, the finer solids particles are held back between the dirt side and the clean side of the filter element 128 according to the filter fineness of the filter element 128.

When the maximum dirt receiving capacity of the filter element 128 is reached, a backflushing phase of the backflushing filter 108 shown in FIG. 3 is initiated to regenerate the filter element 128, i.e. a compressed air-assisted backflushing of the filter medium from the clean side to the dirt side.

The coarse dirt valve 150 is closed for this backflushing process, and the backflushing discharge valve 160 in the flushing line 136 is opened.

The check valve 134 is then briefly opened, and the filtrate side chamber 120 of the flushing filter 108 is acted upon by compressed air by means of the compressed air supply 162, so that filtrate is flushed from the filtrate-side compartment 120 of the backflushing filter 108, assisted by compressed air, by the filter medium of the filter element 128 back into the dirt-side chamber 106 of the backflushing filter 108, from there into the backflushing line 132 and from there through the opened backflushing valve 134 into the flushing line 136.

Together with the filtrate to be used as the flushing medium, the contaminants detached from the filter element 128 during the backflushing also arrive in the flushing line 136.

The backflushed fluid also arrives through the coarse dirt collecting chamber 156 and flushes the coarse dirt accumulated there through the opened backflushing discharge valve 160 into the sedimentation container 140.

The backflushing discharge valve 160 is open for a period of about 1 s to 3 s, for example, during each backflushing phase.

The backflushing phase of the backflushing filter 108 is ended by closing the backflushing valve 134 and the backflushing discharge valve 160 and reopening of the coarse dirt valve 150, whereupon a new filtering phase of the backflushing filter 108 begins.

The backflushing phase of the backflushing filter 108 can be initiated if a predetermined maximum filling level of the coarse dirt in the coarse dirt line 152 is detected by means of the metal sensor 158 on the coarse dirt line 152.

As an alternative or additionally to this, a backflushing phase of the backflushing filter 108 can be initiated if the differential pressure between the dirt side and the clean side of the filter element 128 exceeds a predetermined maximum value.

The processing of the fluid backflushed in the backflushing phase takes place in the sedimentation container 140 shown in FIG. 4 to 7.

Figure 4:
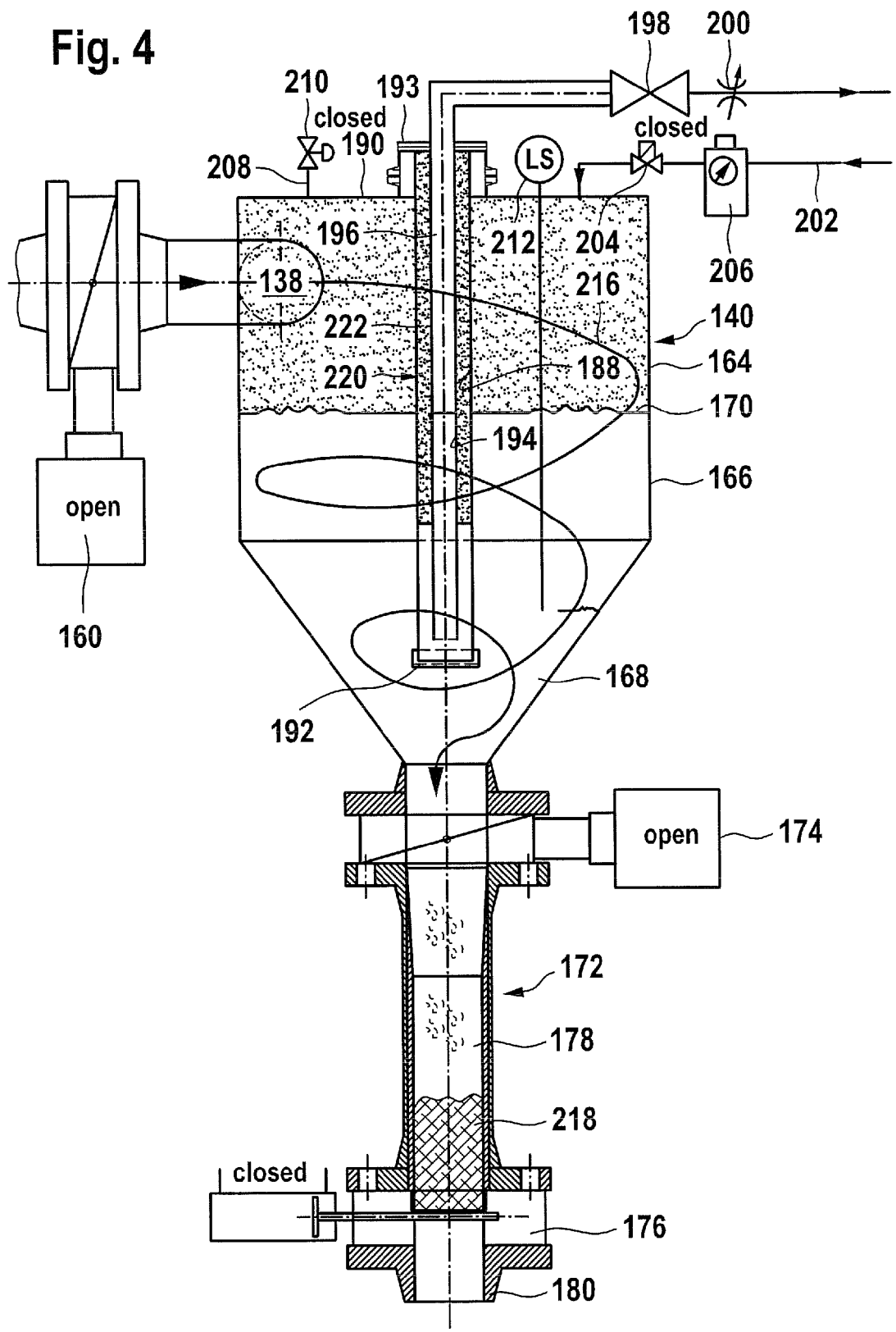
FIG. 4 shows a schematic, partially sectional side view of a sedimentation device of the filter device from FIG. 1 in a sedimentation phase of the sedimentation device.

As can be seen from FIG. 4, the fluid inlet 138 is oriented substantially tangentially to the inner wall of the container housing 164, so that the backflushed fluid enters the interior of the sedimentation container 140 in a helical path 216.

The solids contained in the backflushed fluid (coarse dirt and contaminants backflushed from the filter element 128) are sedimented in the sedimentation container 140 and arrive through the opened upper sluice valve 174 into the sluice chamber 178, which is closed at the bottom by the closed lower sluice valve 176.

A sediment collection 218 forms in the sluice chamber 178.

Thus, the sedimentation container 140 and the sluice mechanism 172 together form a sedimentation device of the filter device 100.

During this sedimentation phase shown in FIG. 4, the check valve 198 in the clear phase return line 196, the compressed air valve 204 in the compressed air supply line 202 and the ventilation valve 210 in the ventilation line 208 are closed.

The fluid level 170 in the sedimentation container 140 rises during this sedimentation phase owing to the supply of backflushed fluid from the flushing line 136.

After a predetermined sedimentation time has expired, the upper sluice valve 174 is closed.

The interior of the sedimentation container 140 is then acted upon in a controlled manner by compressed air with an excess pressure of, for example, about 0.3 bar, by opening the compressed air valve 204.

Furthermore, the check valve 198 is opened in the clear phase return line 196, so that the solids-free fluid (clear phase) contained in the interior of the sedimentation container 140 is forced through the screen 192 at the lower end of the flushing tube 188 into the clear phase return line 196 and returned by means of the clear phase return line 196 into the dirt tank 102.

In the process, the clear phase level also rises in the air cushion chamber 220, which is bounded outwardly by the flushing tube 188 and inwardly by the starting portion 194 of the clear phase return line 196, so the air cushion 222 filling the upper region of the air cushion chamber 220 is compressed until the excess pressure of, for example, about 0.3 bar is reached, at which the compressed air is supplied to the interior of the sedimentation container 140.

Figure 5:
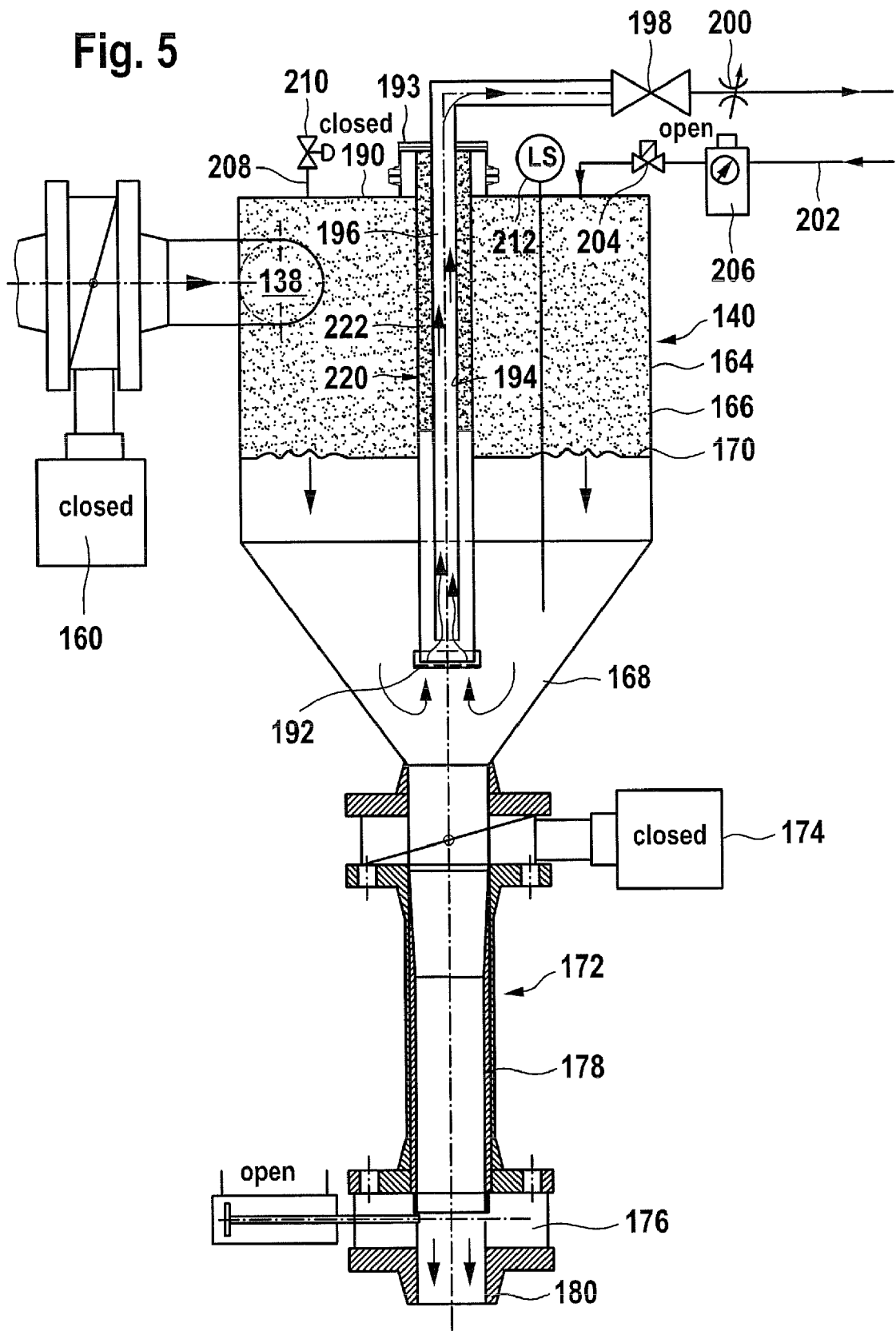
FIG. 5 shows a view of the sedimentation device corresponding to FIG. 4 in a sediment and clear phase discharge phase of the sedimentation device.
Figure 6:
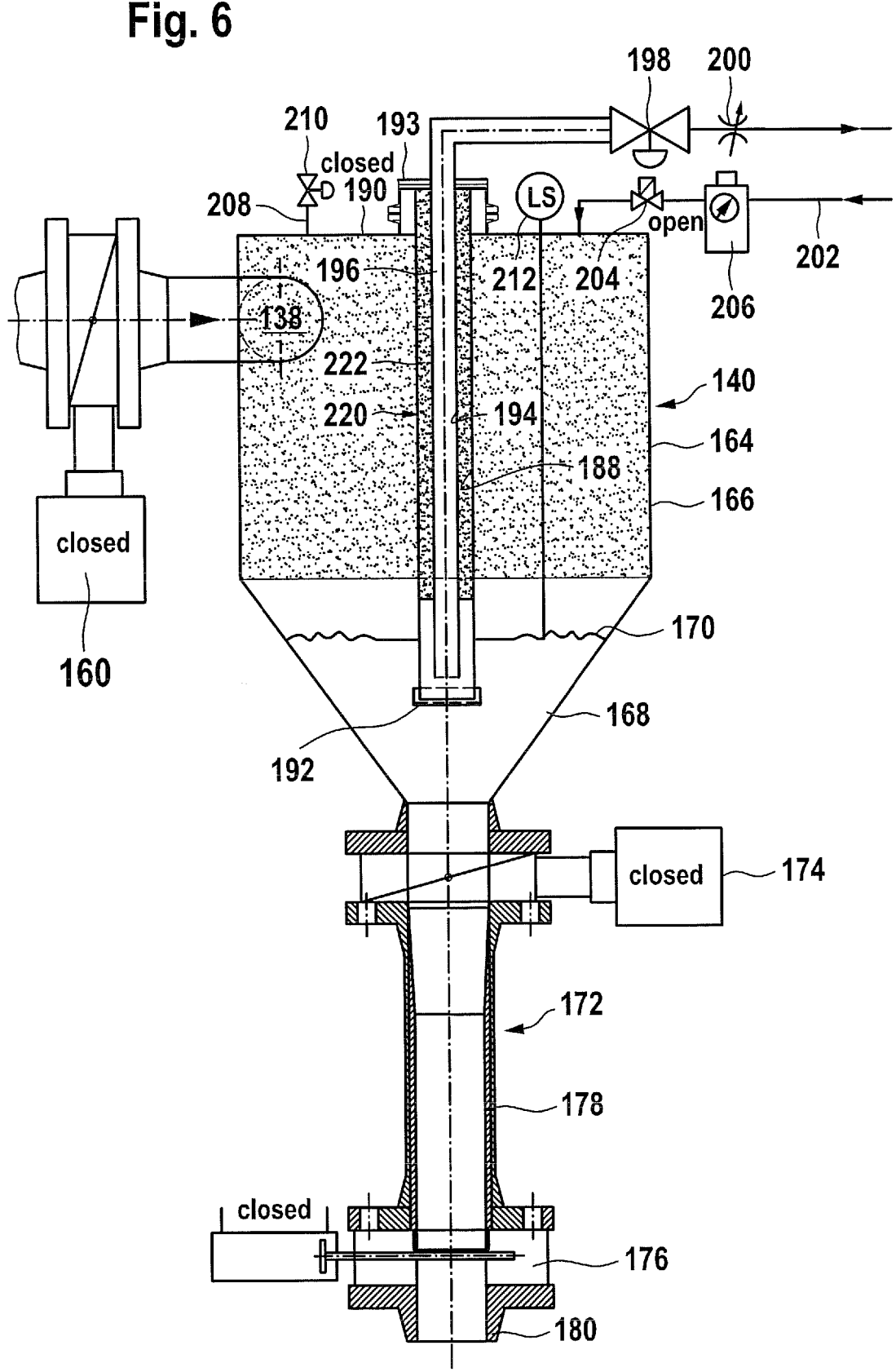
FIG. 6 shows a view of the sedimentation device corresponding to FIG. 5, at the end of the clear phase discharge phase of the sedimentation device.

During this clear phase discharge phase, the beginning of which is shown in FIG. 5 and the end of which is shown in FIG. 6, the fluid level 170 drops in the sedimentation container 140 until the predetermined minimum level shown in FIG. 6 is reached, which is detected by means of the level probe 212.

During this clear phase discharge phase, the sluice chamber 178 is emptied by opening the lower sluice valve 176, so that the sediment which has accumulated in the sluice chamber 178 and which contains a solids fraction and residual fluid, arrives through the sedimentation discharge line 180 into the solids separator 182.

After emptying the sluice chamber 178, the lower sluice valve 176 is closed again (see FIG. 6).

The solids fraction of the sediment is separated from the residual fluid in the solids separator 182. The residual fluid is supplied to the dirt tank 102 by means of the residual fluid return line 186. The solids content is supplied to the solids collection container 187 and supplied from there for further treatment or disposal.

On reaching the minimum fluid level 170 in the sedimentation container 140, the compressed air valve 204 in the compressed air supply line 202 and the check valve 198 in the clear phase return line 196 are closed.

The ventilation valve 210 and the upper sluice valve 174 are then opened simultaneously, so the fluid column in the lower region of the air cushion chamber 220 is abruptly relieved of pressure.

The compressed air cushion 222 present in the upper region of the air cushion chamber 220 therefore abruptly expands downward, so the fluid located in the lower region of the flushing tube 188 is forced through the screen 192 into the lower portion 168 of the container housing 164 and in the process detaches contaminants which have accumulated on the screen 192 from the screen 192 and entrains them.

The contaminants thus detached from the screen 192 drop down through the opened upper sluice valve 174 into the sluice chamber 178.

This concludes the screen cleaning phase shown in FIG. 7.

A renewed sedimentation phase of the sedimentation container 140 begins with the next opening of the backflushing discharge valve 160 (see FIG. 4), i.e. with the next backflushing phase of the backflushing filter 108.

In an alternative configuration of the above-described filter device 100, the clear phase return line 196 does not lead from the sedimentation container 140 to the dirt tank 102 but to the clean tank 148.

Otherwise, this alternative embodiment of the filter device 100 coincides with regard to structure and function with the above-described filter device 100.

The invention claimed is:

1. Filter device for filtering a fluid medium containing solids, comprising
a backflushing filter and
a flushing line, through which fluid backflushed during a backflushing phase from the backflushing filter can be supplied to a further treatment mechanism,
wherein the further treatment mechanism comprises at least one of a sedimentation device and a solids separator,
wherein the backflushing filter has a coarse dirt outlet which is connected to the flushing line at a mouth of the coarse dirt outlet so that coarse dirt which has arrived through the coarse dirt outlet into the flushing line can be supplied to the further treatment mechanism together with the backflushed fluid during the backflushing phase and which coarse dirt outlet is constructed to enable discharging coarse dirt from the backflushing filter into the flushing line during a filtering phase of the backflushing filter,
wherein the backflushing filter has, in addition to the coarse dirt outlet, a further outlet to which the flushing line is connected,
wherein the flushing line has a discharge valve, which is arranged downstream of the mouth of the coarse dirt outlet in the flushing line and upstream of the further treatment device,
wherein the coarse dirt outlet has a coarse dirt valve, which is arranged upstream of the mouth of the coarse dirt outlet, for closing the coarse dirt outlet during the backflushing phase,
wherein the filter device comprises a sensor for detecting a filling level of the coarse dirt in a coarse dirt collecting chamber in the coarse dirt outlet and/or in the flushing line and for initiating a backflushing phase of the backflushing filter if a predetermined maximum filling level of the coarse dirt is detected by the sensor.

2. Filter device according to claim 1, wherein the coarse dirt outlet opens into a substantially horizontally extending portion of the flushing line.

3. Filter device according to claim 1, wherein the sensor is configured as a metal sensor.

4. Filter device according to claim 1, wherein the flushing line has a backflushing valve, which is arranged upstream of a mouth of the coarse dirt outlet in the flushing line.

5. Filter device according to claim 1, wherein the backflushing filter is automatically backflushed if a predetermined differential pressure between a dirt side and a clean side of the backflushing filter is exceeded and/or a predetermined maximum filling level of a coarse dirt collecting chamber in the flushing line is detected.

* * * * *